US009313185B1

(12) United States Patent
Pei (10) Patent No.: US 9,313,185 B1
(45) Date of Patent: *Apr. 12, 2016

(54) SYSTEMS AND METHODS FOR AUTHENTICATING DEVICES

(71) Applicant: Symantec Corporation, Mountain View, CA (US)

(72) Inventor: Mingliang Pei, Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/308,679

(22) Filed: Jun. 18, 2014

Related U.S. Application Data (63) Continuation of application No. 13/336,435, filed on Dec. 23, 2011, now Pat. No. 8,799,646.

(51) Int. Cl.
*H04L 29/06* (2006.01)
*H04L 9/32* (2006.01)

(52) U.S. Cl.
CPC .......... *H04L 63/062* (2013.01); *H04L 63/0807* (2013.01); *H04L 63/0876* (2013.01)

(58) Field of Classification Search
CPC ..... H04L 9/0825; H04L 9/3228; H04L 9/321; H04L 63/0428; H04L 63/08; H04L 63/06; H04L 63/0876; H04L 63/062; H04L 63/0807
USPC .............. 726/2–7, 26–30; 713/155, 168, 169, 713/170; 380/30, 277
See application file for complete search history.

(56) References Cited

U.S. PATENT DOCUMENTS

| 8,984,279 B2* | 3/2015 | Kostiainen et al. ........... 713/156 |
| 9,098,678 B2* | 8/2015 | Hao ...................... H04L 9/3213 |
| 2010/0161965 A1 | 6/2010 | Solin et al. |
| 2011/0159848 A1* | 6/2011 | Pei et al. ........................ 455/411 |
| 2011/0162053 A1* | 6/2011 | Pei et al. ............................ 726/6 |

(Continued)

FOREIGN PATENT DOCUMENTS

CA        2553081        1/2008

OTHER PUBLICATIONS

Doherty, A. et al., "Dynamic Symmetric Key Provisioning Protocol (DSKPP) draft-ietf-keyprov-dskpp-07.txt", http://tools.ietf.org/html/draft-ietf-keyprov-dskpp-07#appendix-D.3, as accessed Aug. 29, 2011, (Feb. 9, 2009).

(Continued)

*Primary Examiner* — Shanto M Abedin
(74) *Attorney, Agent, or Firm* — ALG Intellectual Property, LLC (57) ABSTRACT

A computer-implemented method for authenticating devices may include (1) identifying a request from a device for a credentialing service to issue a credential to the device, the request including an application identifier encrypted with a first encryption key, the first encryption key having been derived by the device based on a token provisioned to the device by a vendor of the device, (2) transmitting the request to the credentialing service, (3) receiving, from the credentialing service, the credential encrypted using a second encryption key, the second encryption key having been derived by the device based on the token, and (4) providing the encrypted credential to the device. Various other methods, systems, and computer-readable media are also disclosed.

20 Claims, 6 Drawing Sheets

(56) References Cited

U.S. PATENT DOCUMENTS

2011/0271099 A1* 11/2011 Preiss et al. .................. 713/155
2013/0174271 A1* 7/2013 Handal ............. G06F 17/30017
                                                          726/27

OTHER PUBLICATIONS

Hoyer, P. et al., "Portable Symmetric Key Container (PSKC) draft-ietf-keyprov-pskc-02.txt", http://tools.ietf.org/html/draft-ietf-keyprov-pskc-02, as accessed Aug. 29, 2011, (Feb. 22, 2009).

M'Raihi, D. et al., "TOTP: Time-based One-time Password Algorithm draft-mraihi-totp-timebased-01.txt", http://tools.ietf.org/html/draft-mraihi-totp-timebased-01, as accessed Aug. 29, 2011, (Jan. 5, 2009).

Kelly, S. et al., "Using HMAC-SHA-256, HMAC-SHA-384, and HMAC-SHA-512 with IPsec", http://tools.ietf.org/html/rfc4868, as accessed Aug. 29, 2011, (May 2007).

"RSA SecurID", http://www.emc.com/security/rsa-securid/index.htm, as accessed Aug. 29, 2011, (on or before Aug. 29, 2011).

Bellare, Mihir "Attacks on SHA-1", http://www.openauthentication.org/pdfs/Attacks%20on%20SHA-1.pdf, as accessed Aug. 29, 2011, (Mar. 2, 2005).

* cited by examiner

SYSTEMS AND METHODS FOR AUTHENTICATING DEVICES

CROSS REFERENCE TO RELATED APPLICATION

This application is a continuation of U.S. application Ser. No. 13/336,435, filed 23 Dec. 2011, the disclosure of which is incorporated, in its entirety, by this reference.

BACKGROUND

Individuals and organizations increasingly rely on digital communications (e.g., via the Internet) to conduct their daily affairs. Due to the sensitivity of some transactions, these individuals and organizations may wish to communicate securely and to ensure that a party to a transaction is who the party claims to be.

In some cases, parties to a transaction may use a shared secret (e.g., information that each party has to the exclusion of the rest of the world) to communicate securely and/or to provide authentication. For example, a shared secret may be used to derive one or more encryption and/or authentication keys and/or to generate message authentication codes to authenticate messages. In some cases, a shared secret may be used to generate one-time passwords.

Unfortunately, the process of sharing a secret may allow a malicious third party to steal the secret (e.g., in transit or in storage), thereby potentially defeating the purpose of the shared secret to enable secure, authenticated communications. Accordingly, the instant disclosure identifies and addresses a need for additional and improved systems and methods for authenticating devices.

SUMMARY

As will be described in greater detail below, the instant disclosure generally relates to systems and methods for authenticating devices by using authentication information possessed by vendors of the devices and provided by the vendors to credentialing services. In one example, a computer-implemented method for authenticating devices may include (1) identifying a request from a device for a credentialing service to issue a credential to the device, the request including an application identifier encrypted with a first encryption key, the first encryption key having been derived by the device based on a token provisioned to the device by a vendor of the device, (2) transmitting the request to the credentialing service, (3) receiving, from the credentialing service, the credential encrypted using a second encryption key, the second encryption key having been derived by the device based on the token, and (4) providing the encrypted credential to the device.

In some examples, the request may include a nonce generated by the device. In these examples, the credential being encrypted using the second encryption key may entail the credential being encrypted using a session key derived from the second encryption key and the nonce.

In some embodiments, the device may be configured to derive the first encryption key and the second encryption key based on the token. Additionally or alternatively, the device may be configured to generate a one-time password with the credential.

In some examples, the vendor may have registered an application identified by the application identifier with the credentialing service. In these examples, the vendor may have registered the application by transmitting the first encryption key and the second encryption key to the credentialing service. Additionally, in these examples, the vendor may have transmitted the first encryption key and the second encryption key in a message encrypted with a public encryption key for which the credentialing service possesses a corresponding private decryption key.

In some examples, the computer-implemented method may also include (1) receiving a message authentication code from the credentialing service, the message authentication code having been generated by the credentialing service using the first encryption key and the credential and (2) providing the message authentication code to the device. In these examples, the device may be configured to authenticate the credential with the message authentication code. In some examples, the computer-implemented method may also include storing the encrypted credential for the device.

In one embodiment, a system for implementing the above-described method may include (1) an identification module programmed to identify a request from a device for a credentialing service to issue a credential to the device, the request including an application identifier encrypted with a first encryption key, the first encryption key having been derived by the device based on a token provisioned to the device by a vendor of the device, (2) a transmission module programmed to transmit the request to the credentialing service, (3) a receiving module programmed to receive, from the credentialing service, the credential encrypted using a second encryption key, the second encryption key having been derived by the device based on the token, and (4) a providing module programmed to provide the encrypted credential to the device. The system may also include at least one processor configured to execute the identification module, the transmission module, the receiving module, and the providing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a request from a device for a credentialing service to issue a credential to the device, the request including an application identifier encrypted with a first encryption key, the first encryption key having been derived by the device based on a token provisioned to the device by a vendor of the device, (2) transmit the request to the credentialing service, (3) receive, from the credentialing service, the credential encrypted using a second encryption key, the second encryption key having been derived by the device based on the token, and (4) provide the encrypted credential to the device.

As will be explained in greater detail below, by using authentication information possessed by vendors of the devices and provided by the vendors to credentialing services, the systems and methods described herein may the systems and methods described herein may authenticate any of a variety of devices. In some examples, these systems and methods may facilitate sharing secrets with devices while avoiding risks of the secrets being stolen by third parties and/or any other parties involved in transmitting the secrets between the senders and the receivers. Additionally, in some examples, these systems and methods may enable the creation of application-specific keys.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
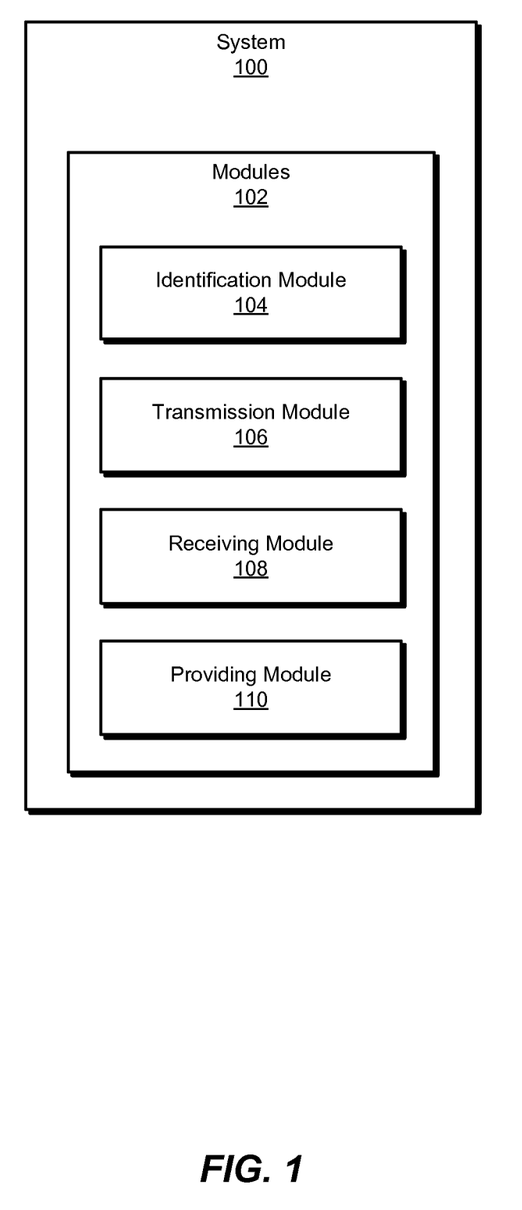
FIG. 1 is a block diagram of an exemplary system for authenticating devices.
Figure 2:
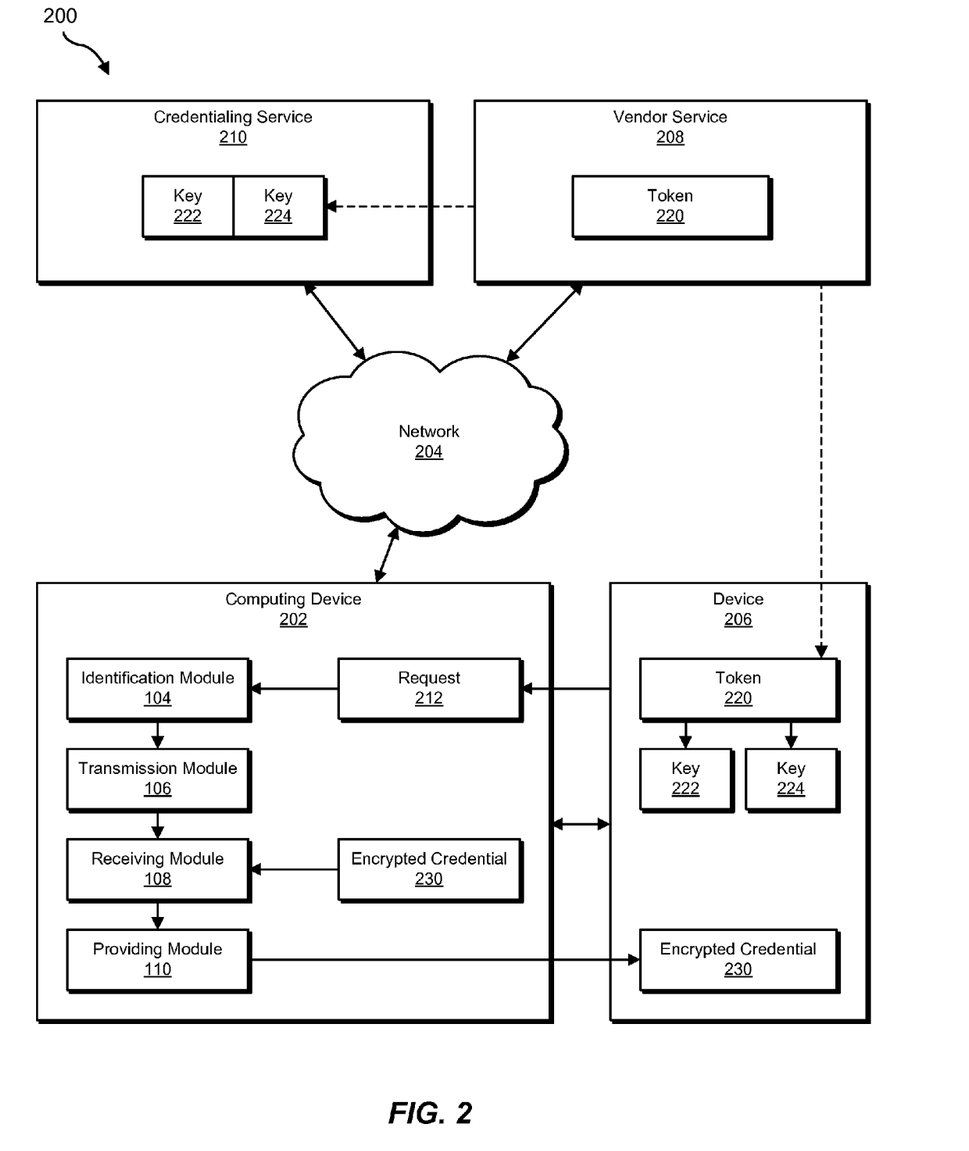
FIG. 2 is a block diagram of an exemplary system for authenticating devices.
Figure 3:
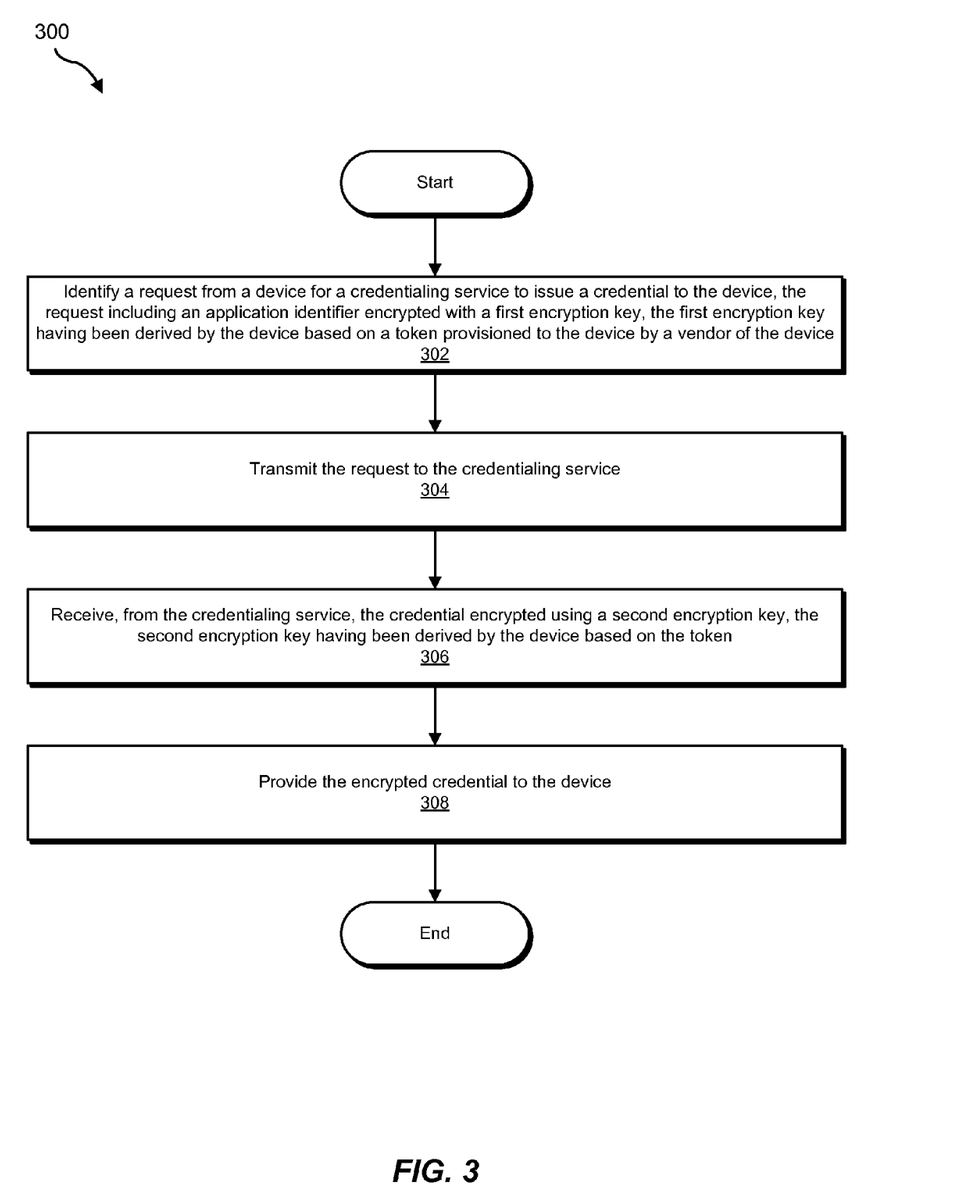
FIG. 3 is a flow diagram of an exemplary method for authenticating devices.
Figure 4:
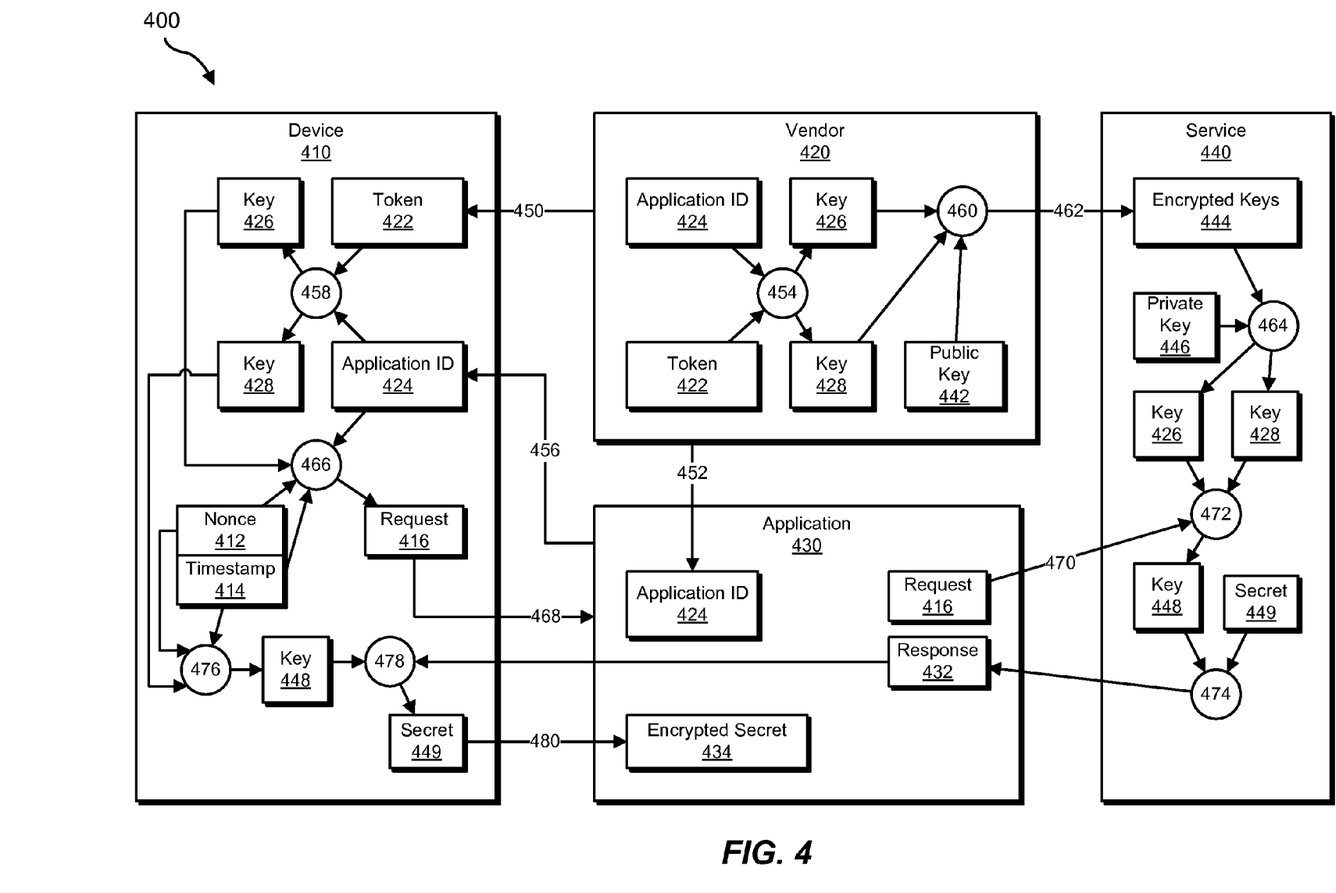
FIG. 4 is a block diagram of an exemplary system for authenticating devices.

The following will provide, with reference to FIGS. 1, 2, and 4, detailed descriptions of exemplary systems for authenticating devices. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for authenticating devices. As illustrated in this figure, exemplary system 100 may include one or more modules 102 for performing one or more tasks. For example, and as will be explained in greater detail below, exemplary system 100 may include an identification module 104 programmed to identify a request from a device for a credentialing service to issue a credential to the device, the request including an application identifier encrypted with a first encryption key, the first encryption key having been derived by the device based on a token provisioned to the device by a vendor of the device. Exemplary system 100 may also include a transmission module 106 programmed to transmit the request to the credentialing service.

In addition, and as will be described in greater detail below, exemplary system 100 may include a receiving module 108 programmed to receive, from the credentialing service, the credential encrypted using a second encryption key, the second encryption key having been derived by the device based on the token. Exemplary system 100 may also include a providing module 110 programmed to provide the encrypted credential to the device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, device 206, vendor 208, and/or service 210), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 connected to a device 206 and in communication with a service 210 via a network 204. For example, computing device 202 may be configured to authenticate device 206 with service 210.

In one embodiment, identification module 104, transmission module 106, receiving module 108, and/or providing module 110 from FIG. 1 may, when executed by at least one processor of computing device 202, facilitate computing device 202 in authenticating devices. For example, and as will be described in greater detail below, one or more of modules 102 may cause computing device 202 to (1) identify a request (e.g., a request 212) from a device (e.g., device 206) for a credentialing service (e.g., credentialing service 210) to issue a credential (e.g., an encrypted credential 230) to the device, the request including an application identifier encrypted with a first encryption key (e.g., a key 222), the first encryption key having been derived by the device based on a token (e.g., a token 220) provisioned to the device by a vendor of the device (e.g., that also controls vendor service 208), (2) transmit the request to the credentialing service (e.g., transmit request 212 to service 210), (3) receive, from the credentialing service, the credential encrypted using a second encryption key (e.g., a key 224), the second encryption key having been derived by the device based on the token, and (4) provide the encrypted credential to the device (e.g., provide encrypted credential 230 to device 206).

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Device 206 generally represents any type or form of computing device capable of performing one or more authentication functions. Examples of device 206 include, without limitation, a trusted platform module or a biometric reader.

Vendor service 208 generally represents any service (e.g., hosted and/or facilitated by one or more computing devices connected to the Internet) capable of receiving, analyzing, and/or providing authentication data. In some examples, vendor service 208 may represent a service controlled by a vendor of device 206 and/or a trusted partner of the vendor of device 206.

Credentialing service 210 generally represents any service (e.g., hosted and/or facilitated by one or more computing devices connected to the Internet) capable of receiving, analyzing, and/or providing authentication data. In some examples, credentialing service 210 may represent a service in a trusted partnership with a vendor of device 206.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for authenticating devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a request from a device for a credentialing service to issue a credential to the device, the request including an application identifier encrypted with a first encryption key, the first encryption key having been derived by the device based on a token provisioned to the device by a vendor of the device. For example, at step 302 identification module 104 may, as part of computing device 202 in FIG. 2, identify request 212 from device 206 for credentialing service 210 to issue encrypted credential 230 to device 206, request 212 including an application identifier encrypted with key 222 derived by device 206 based on token 220 provisioned to device 206 by a vendor of device 206 (e.g., that also controls vendor service 208).

The request may include any of a variety of data. In some examples, the request may include client authentication data. For example, the request may include the application identifier and/or a device identifier. Additionally or alternatively, the request may include a nonce generated by the device. In some examples, the request may include a timestamp generated by the device marking the time of the request. As used herein, the term "nonce" may refer to any arbitrary, random, and/or pseudo-random value. In some examples, the term "nonce" may refer to a single-use value. Additionally or alternatively, the term "nonce" may refer to a value used to sign a cryptographic communication.

The device may include any of a variety of devices. For example, the device may include a trusted platform module. As used herein, the phrase "trusted platform module" may refer to any computing device capable of receiving, storing, processing, and/or presenting one or more authentication factors. For example, the phrase "trusted platform module" may refer to a secure cryptoprocessor capable of performing one or more cryptographic operations. For example, the device may be able to hold a symmetric key and perform symmetric-key-based cryptographic functions (e.g., Advanced Encryption Standard encryptions, Hash-based Message Authentication Code encryptions, etc.). In some examples, the trusted platform module may include one or more security measures to provide tamper resistance (e.g., such that a party in possession of the trusted platform module may be unable to exploit the possession of the trusted platform module to access secrets stored by the trusted platform module). In another example, the device may include a biometric reader. For example, the device may include a fingerprint reader, an iris scanner, etc. In some examples, the device may not support one or more public key infrastructure functionalities.

As used herein, the term "credential" may refer to any authentication factor and/or information used to derive an authentication factor. In some examples, the term "credential" may refer to a shared secret. Additionally or alternatively, the term "credential" may refer to information which, in combination with information already possessed by a device, allows the device to derive a shared secret. For example, the term "credential" may refer to a one-time-password credential that may be used to derive one or more one-time passwords.

The application identifier may include any of a variety of information. In some examples, the application identifier may identify an authentication client configured to interact with the device. Additionally or alternatively, the application identifier may identify the vendor of the device. In some examples, the application identifier may correspond to a specific user and/or group of users. In some examples, the vendor may have registered an application identified by the application identifier with the credentialing service. For example, the vendor may transmit the application identifier to the credentialing service. Additionally, in some examples, the vendor may transmit one or more application-specific keys to the credentialing service. For example, the vendor may transmit the first encryption key and, as will be described in greater detail below, a second encryption key to the credentialing service. In this example, the vendor may transmit the application-specific keys to the service securely. For example, the vendor may have transmitted the first encryption key and the second encryption key in a message encrypted with a public encryption key for which the credentialing service possesses a corresponding private decryption key. In some examples, the vendor may also transmit additional metadata to the credentialing service, such as information about the vendor.

As used herein, the phrase "encryption key" may refer to any cryptographic key and/or cryptographic value for use in one or more cryptographic functions. For example, the phrase "encryption key" may refer to a key used for encryption and/or authentication.

The first encryption key may include a symmetric encryption key. As will be described in greater detail below, in some examples, the first encryption key may include an authentication key that will be used as a message authentication code key (e.g., for an HMAC-SHA1 encryption algorithm). In some examples, the first encryption key may include a strong random value.

As used herein, the term "token" may refer to any data possessed by the device and/or derived from data possessed by the device. In some examples, the token may include data provisioned to the device in an out-of-band process (e.g., outside any communication between the device, the client, and/or the credentialing service). For example, the token may include and/or be derived from data provisioned to the device by a manufacturer and/or vendor of the device. In some examples, the token may be unique to the device (e.g., possessed only by the device and the manufacturer and/or vendor of the device, and not possessed by other devices).

As used herein, the term "vendor" may refer to any vendor, manufacturer, and/or partner of a vendor and/or manufacturer of a device. Accordingly, as used herein, the phrase "vendor service" may refer to any service and/or computing system capable of receiving, processing, and/or transmitting communications on behalf of a vendor of the device.

Identification module 104 may identify the request in any of a variety of contexts. For example, identification module 104 may identify the request by receiving a communication from the device. Additionally or alternatively, identification module 104 may identify the request by initiating the request. For example, identification module 104 may request client authentication data from the device. Identification module 104 may then receive the request for the credential (e.g., including the client authentication data) from the device. In some examples, identification module 104 may only receive the request after the device receives authentication. For example, the device may require authentication from identification module 104 (e.g., that identification module 104 is a part of a trusted application) before responding with the request. Additionally or alternatively, the device may require external authentication. For example, the device may include a fingerprint reader and require a successful fingerprint scan before sending the request to identification module 104.

FIG. 4 illustrates an exemplary system 400 for authenticating devices. As shown in FIG. 4, exemplary system 400 may include a device 210, a vendor 420, an application 430, and a service 440. Vendor 420 may possess a token 422. At step 450, vendor 420 may provision device 410 with token 422. For example, when vendor 420 and/or a trusted partner of vendor 420 is in possession of device 410 (e.g., at the time of manufacture of device 410, at an initial configuration of device 410 before a transfer of ownership of device 410, etc.). In this manner, vendor 420 may ensure that only vendor 420 and device 410 possess token 422.

In some examples, vendor 420 may also provide application 430 for use with device 410. At step 452, vendor 420 may assign an application ID 424 to application 430. At step 454, vendor 420 may generate a key 426 and a key 428 from token 422 and application ID 424. Vendor 420 may use any suitable derivation algorithm to derive keys 426 and 428. For example, vendor 420 may encrypt application ID 424 with token 422 and split the result into key 426 and key 428. In some examples, application 430 may identify itself to device 410. For example, application 430 may provide application ID 424 to device 410 (e.g., in order to initiate a request for an application-specific credential for device 410 from service 440). Accordingly, device 410 may, at step 458, use the same key derivation algorithm as vendor 420 to derive keys 426 and 428 from token 422 and application ID 424.

At step 460, vendor 420 may prepare an encrypted message including keys 426 and 428. Vendor 420 may encrypt the message with a public key 442 corresponding to a private key 446 possessed by service 440. At step 462, vendor 420 may transmit encrypted keys 444 to service 440. Service 440 may, at step 464, decrypt encrypted keys 444 with private key 446. Accordingly, service 440 may possess keys 426 and 428.

Device 410 may, at step 466, generate client authentication data. For example, device 410 may generate a nonce 412 and a timestamp 414. Device 410 may then, at step 466, encrypt a combination (e.g., a concatenation) of application ID 424, nonce 412, and timestamp 414 with key 426, resulting in a request 416. At step 468, device 410 may communicate request 416 with application 430. Accordingly, at step 302 identification module 104 may, as a part of application 430, identify request 416.

Returning to FIG. 3, at step 304 one or more of the systems described herein may transmit the request to the credentialing service. For example, at step 304 transmission module 106 may, as part of computing device 202 in FIG. 2, transmit request 212 to credentialing service 210. Using FIG. 4 as an additional example, at step 470 transmission module 106 may, as a part of application 430, transmit request 416 to service 440.

Transmission module 106 may transmit the request to the credentialing service in any suitable manner. In some examples, transmission module 106 may transmit the request without access to encrypted portions of the request (e.g., because the encrypted portions were prepared by the device with the token and/or other information not possessed by transmission module 106). In some examples, transmission module 106 may reformat the request and/or wrap the request for transmission to the credentialing service.

At step 306 one or more of the systems described herein may receive, from the credentialing service, the credential encrypted using a second encryption key, the second encryption key having been derived by the device based on the token. For example, at step 306 receiving module 108 may, as part of computing device 202 in FIG. 2, receive, from credentialing service 210, encrypted credential 230 encrypted using key 224, key 224 having been derived based on token 220.

As mentioned earlier, in some examples, the request may include a nonce generated by the device. In these examples, the credential may have been encrypted using the second encryption key in that the credential may have been encrypted using a session key derived from the second encryption key and the nonce. In some examples, the session key may additionally be derived from a timestamp generated by the device and included in the request. For example, the second encryption key may include a derivation key used to derive session keys. In this example, the credentialing service may generate a session key applying the HMAC_SHA1 encryption algorithm to a combination (e.g., a concatenation) of the nonce and a timestamp (e.g., previously received from the device) using the second encryption key as the message authentication code key.

Using FIG. 4 as an example, service 440 may, at step 472, generate a key 448. For example, at step 472 service 440 may 1) decrypt request 416 with key 426 to retrieve nonce 412 and timestamp 414 from request 416 and 2) generate key 448 by encrypting the nonce and the timestamp with key 428. Service 440 may then, at step 474, 1) generate a secret 449, 2) encrypt secret 449 with key 448, and 3) transmit the encrypted secret 449 (e.g., the request credential) in a response 432 to application 430. Accordingly, at step 306 receiving module 108 may, as a part of application 430, receive response 432.

In some examples, receiving module 108 may also receive a message authentication code from the credentialing service. In these examples, the message authentication code may have been generated by the credentialing service using the first encryption key and the credential. Using FIG. 4 as an example, service 440 may also encrypt secret 449 with key 426 and transmit this encryption of secret 449 to application 430 as a part of response 432.

Returning to FIG. 3, at step 308 one or more of the systems described herein may provide the encrypted credential to the device. For example, at step 308 providing module 110 may, as part of computing device 202 in FIG. 2, provided encrypted credential 230 to device, from credentialing service 210, encrypted credential 230 to device 206.

As mentioned above, in some examples one or more of the systems described herein may receive a message authentication code from the credentialing service generated by encrypting the credential (e.g., a portion of the credential representing a secret to share with the device) with the first encryption key. In these examples, providing module 110 may also provide the message authentication code to the device. In these examples, the device may be configured to authenticate the credential with the message authentication code (e.g., before accepting the credential as valid).

In some examples, providing module 110 may also store the encrypted credential for the device. For example, providing module 110 may store the encrypted credential in a storage device accessible to a computing device (such as computing device 202 in FIG. 2) and/or an application (such as application 430 in FIG. 4) connected to and/or in communication with the device. Because the encryption key for the credential is stored within the device, the credential may be safe from exploitation. For example, one or more of the systems described herein may pass the encrypted credential to the device each time the credential is needed to produce an authentication factor, and the device may decrypt the encrypted credential and produce the authentication factor internally. For example, the device may use the credential as a one-time-password seed to generate one-time-passwords for one or more of the systems described herein upon request. Accordingly, in some examples one or more of the systems described herein may provide the encrypted credential to the device, receive a one-time password in response, and use the one-time password as an authentication factor.

Using FIG. 4 as an example, at step 476 device 410 may generate key 448 using the same derivation algorithm as service 440. For example, device 410 may apply key 428 to nonce 412 and timestamp 414 to generate key 448. Device 410 may then, at step 478, 1) receive response 432 from application 430 and 2) decrypt secret 449 with key 448 to extract secret 449. In some examples, at step 480 device 410 may then 1) encrypt secret 449 and 2) pass an encrypted secret 434 to application 430 for storage and/or future use.

In some examples, one or more of the systems described herein may identify a request from a client for a credentialing service to issue a credential to a device. These systems may then receive, from the client, an encrypted client nonce, the encrypted client nonce comprising a client nonce generated by the device and encrypted by the device using a public encryption key, the public encryption key corresponding to a private decryption key possessed by the credentialing service. These systems may then receive, from the client, device authentication data provided by the device. These systems may then verify the device authentication data with a vendor service associated with the device. These systems may then receive, from the vendor service, vendor authentication data. These systems may then provide the vendor authentication data to the client.

As explained above, by using authentication information possessed by vendors of the devices and provided by the vendors to credentialing services, the systems and methods described herein may the systems and methods described herein may authenticate any of a variety of devices. In some examples, these systems and methods may facilitate sharing secrets with devices while avoiding risks of the secrets being stolen by third parties. Additionally, in some examples, these systems and methods may enable the creation of application-specific keys.

Figure 5:
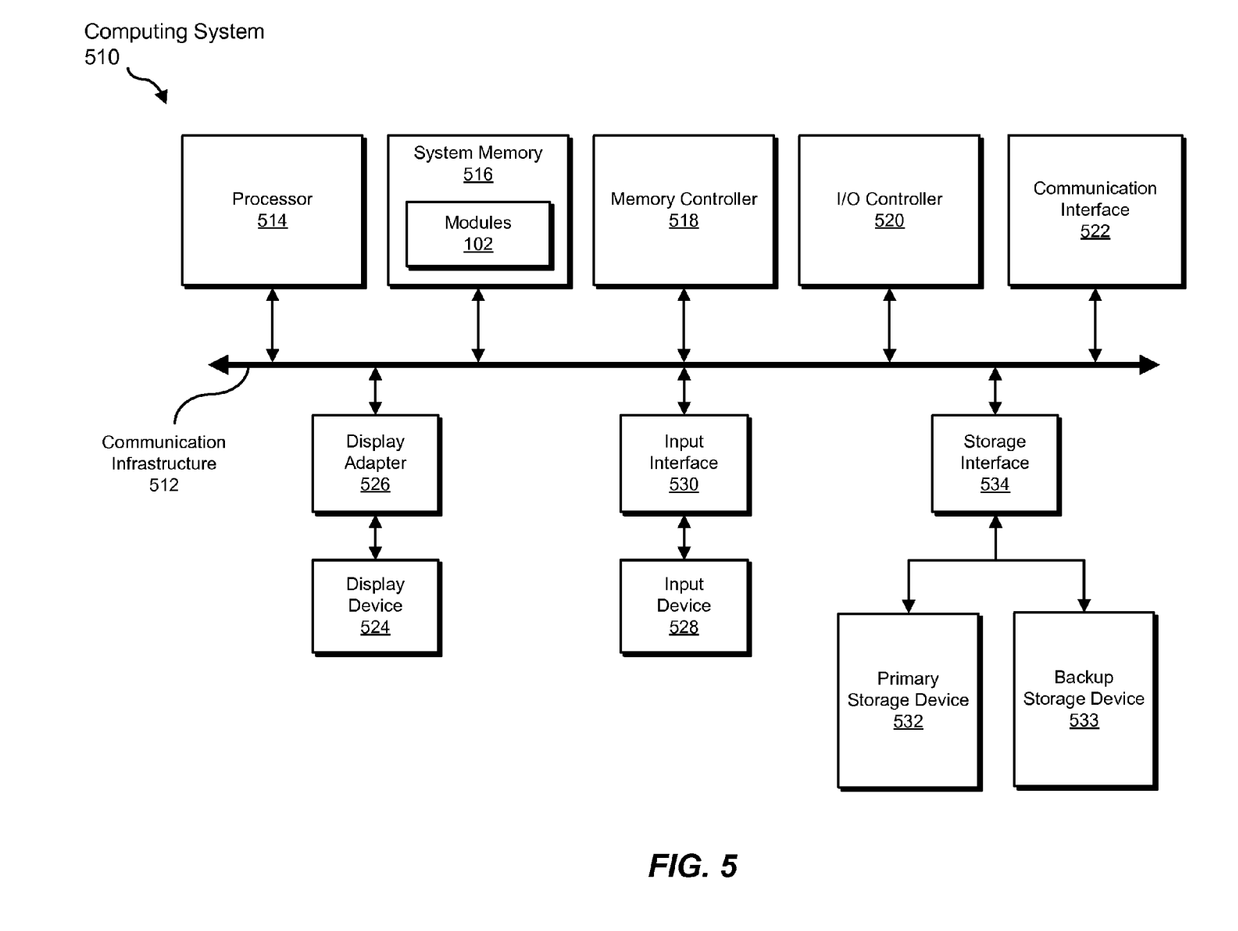
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, transmitting, receiving, providing, encrypting, using, deriving, generating, registering, authenticating, and storing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
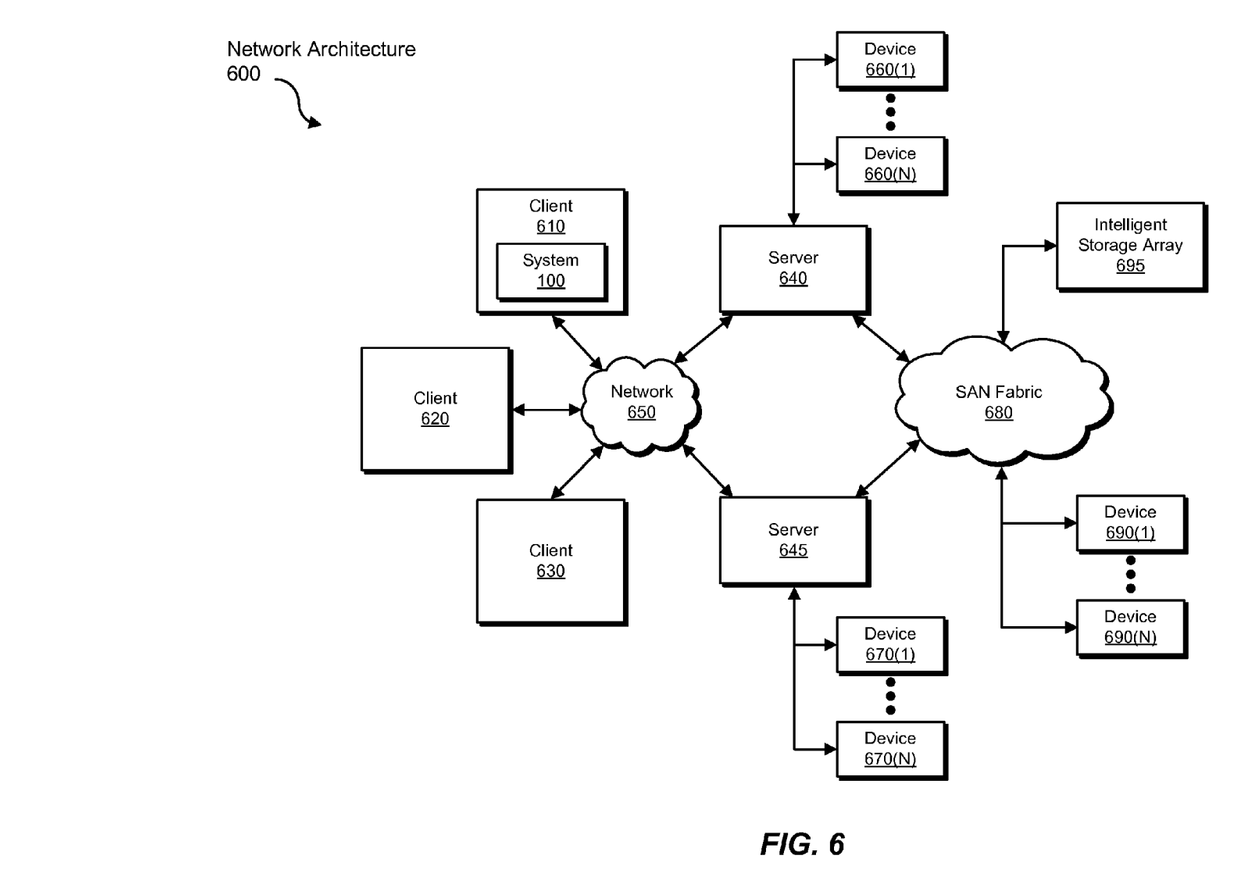
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, transmitting, receiving, providing, encrypting, using, deriving, generating, registering, authenticating, and storing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for authenticating devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for authenticating devices. As another example, one or more of the modules recited herein may transform a device into an authenticated device and/or a device provisioned with a shared secret.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for authenticating devices, at least a portion of the method being performed by a computing device comprising at least one processor, the method comprising:
   identifying, at a computing system, a request from a device for a credentialing service to issue a credential to the device, the request comprising an application identifier encrypted with a first encryption key, the first encryption key having been derived by the device based on a token provisioned to the device by a vendor of the device;
   transmitting, from the computing system, the request to the credentialing service, wherein the credentialing service responds to the request by encrypting the credential with a second encryption key that was derived based on the token and by sending the encrypted credential to the computing system;
   receiving, at the computing system and from the credentialing service, the credential encrypted with the second encryption key, wherein the vendor has registered an application identified by the application identifier with the credentialing service;
   providing, from the computing system, the encrypted credential to the device, wherein the device derives the second encryption key based on the token and uses the second encryption key to decrypt the encrypted credential.

2. The computer-implemented method of claim 1, wherein the vendor has registered the application by transmitting the first encryption key and the second encryption key to the credentialing service.

3. The computer-implemented method of claim 2, wherein the vendor has transmitted the first encryption key and the second encryption key in a message encrypted with a public encryption key for which the credentialing service possesses a corresponding private decryption key.

4. The computer-implemented method of claim 1, further comprising storing the encrypted credential for the device.

5. The computer-implemented method of claim 1, wherein:
   the request includes a nonce generated by the device;
   the credential being encrypted using the second encryption key comprises the credential being encrypted using a session key derived from the second encryption key and the nonce.

6. The computer-implemented method of claim 1, wherein the device is configured to derive the first encryption key and the second encryption key based on the token.

7. The computer-implemented method of claim 1, wherein the device is configured to generate a one-time password with the credential.

8. The computer-implemented method of claim 1, further comprising:
   receiving a message authentication code from the credentialing service, the message authentication code having been generated by the credentialing service using the first encryption key and the credential;
   providing the message authentication code to the device.

9. The computer-implemented method of claim 8, wherein the device is configured to authenticate the credential with the message authentication code.

10. A system for authenticating devices, the system comprising:
    a memory;
    an identification module, stored in the memory, programmed to identify, at a computing system, a request from a device for a credentialing service to issue a credential to the device, the request comprising an application identifier encrypted with a first encryption key, the first encryption key having been derived by the device based on a token provisioned to the device by a vendor of the device;
    a transmission module, stored in the memory, programmed to transmit, from the computing system, the request to the credentialing service, wherein the credentialing service responds to the request by encrypting the credential with a second encryption key that was derived based on the token and by sending the encrypted credential to the computing system;
    a receiving module, stored in the memory, programmed to receive, at the computing system and from the credentialing service, the credential encrypted with the second encryption key, wherein the vendor has registered an application identified by the application identifier with the credentialing service;
    a providing module, stored in the memory, programmed to provide, from the computing system, the encrypted credential to the device, wherein the device derives the second encryption key based on the token and uses the second encryption key to decrypt the encrypted credential; and
    at least one hardware processor configured to execute the identification module, the transmission module, the receiving module, and the providing module.

11. The system of claim 10, wherein the vendor has registered the application by transmitting the first encryption key and the second encryption key to the credentialing service.

12. The system of claim 11, wherein the vendor has transmitted the first encryption key and the second encryption key in a message encrypted with a public encryption key for which the credentialing service possesses a corresponding private decryption key.

13. The system of claim 10, wherein the providing module is further programmed to store the encrypted credential for the device.

14. The system of claim 10, wherein:
    the request includes a nonce generated by the device;
    the credential being encrypted using the second encryption key comprises the credential being encrypted using a session key derived from the second encryption key and the nonce.

15. The system of claim 10, wherein the device is configured to derive the first encryption key and the second encryption key based on the token.

16. The system of claim 10, wherein the device is configured to generate a one-time password with the credential.

17. The system of claim 10, wherein:
    the receiving module is further programmed to receive a message authentication code from the credentialing service, the message authentication code having been generated by the credentialing service using the first encryption key and the credential;
    the providing module is further programmed to provide the message authentication code to the device.

18. A non-transitory computer-readable-storage medium comprising one or more computer-executable instructions that, when executed by at least one processor of a computing device, cause the computing device to:
    identify, at a computing system, a request from a device for a credentialing service to issue a credential to the device, the request comprising an application identifier encrypted with a first encryption key, the first encryption key having been derived by the device based on a token provisioned to the device by a vendor of the device, transmit, from the computing system, the request to the credentialing service, wherein the credentialing service responds to the request by encrypting the credential with a second encryption key that was derived based on the token and by sending the encrypted credential to the computing system;

receive, at the computing system and from the credentialing service, the credential encrypted with the second encryption key, wherein the vendor has registered an application identified by the application identifier with the credentialing service, provide, from the computing system, the encrypted credential to the device, wherein the device derives the second encryption key based on the token and uses the second encryption key to decrypt the encrypted credential.

19. The computer-readable-storage medium of claim 18, wherein the vendor has registered the application by transmitting the first encryption key and the second encryption key to the credentialing service.

20. The computer-readable-storage medium of claim 19, wherein the vendor has transmitted the first encryption key and the second encryption key in a message encrypted with a public encryption key for which the credentialing service possesses a corresponding private decryption key.

\* \* \* \* \*